United States Patent
Mangan

(10) Patent No.: US 7,069,336 B2
(45) Date of Patent: Jun. 27, 2006

(54) POLICY BASED ROUTING SYSTEM AND METHOD FOR CACHING AND VPN TUNNELING

(75) Inventor: John F. Mangan, Fairfax, VA (US)

(73) Assignee: Time Warner Cable, Stamford, CT (US)

( * ) Notice: Subject to any disclaimer, the term of this patent is extended or adjusted under 35 U.S.C. 154(b) by 754 days.

(21) Appl. No.: 10/061,696

(22) Filed: Feb. 1, 2002

(65) Prior Publication Data

US 2003/0149787 A1    Aug. 7, 2003

(51) Int. Cl.
*G06F 15/173* (2006.01)

(52) U.S. Cl. ............. 709/238; 709/217; 709/227; 709/230; 709/245; 709/249; 370/401

(58) Field of Classification Search ........ 709/217, 709/227, 230, 238, 245, 249; 370/401
See application file for complete search history.

(56) References Cited

U.S. PATENT DOCUMENTS

| | | | |
|---|---|---|---|
| 6,078,590 A | 6/2000 | Farinacci et al. | |
| 6,081,900 A | 6/2000 | Subramaniam et al. | |
| 6,105,027 A | 8/2000 | Schneider et al. | |
| 6,130,892 A | 10/2000 | Short et al. | |
| 6,167,438 A | 12/2000 | Yates et al. | |
| 6,178,505 B1 | 1/2001 | Schneider et al. | |
| 6,182,226 B1 | 1/2001 | Reid et al. | |
| 6,609,148 B1* | 8/2003 | Salo et al. | 709/217 |
| 2001/0030970 A1* | 10/2001 | Wiryaman et al. | 370/401 |
| 2002/0004836 A1 | 1/2002 | Shah | |
| 2002/0024934 A1 | 2/2002 | Galand et al. | |
| 2002/0099826 A1* | 7/2002 | Summers et al. | 709/227 |
| 2003/0028671 A1* | 2/2003 | Mehta et al. | 709/245 |
| 2003/0110276 A1* | 6/2003 | Riddle | 709/230 |

OTHER PUBLICATIONS

Gleason, et al. "A Framework for IP Base Virtual Private Networks", Feb. 2000, 54 p., pp.1 and 17-19 relied on.
Huston, ISP Survival Guide, 661 p. copyright 1999, pp. 464-467 relied on.
Lam et al. Inter-Domain Router Placement and Traffic Engineering May 5, 2002 IEEE pp. 2443-2448.

* cited by examiner

*Primary Examiner*—Yves Dalencourt
(74) *Attorney, Agent, or Firm*—Roberts Mardula & Wertheim LLC

(57) ABSTRACT

An enterprise network router interface communicates with a public regional Autonomous System Border Router (ASBR). The ASBR only forwards the enterprise network traffic to the router interface. The router interface redirects data packets to data highly specialized packet processing appliances for parallel processing of VPN and cache application traffic. Policy based routing instructions are imposed on the ASBR for subsequent secure, tunneled transmission. This enterprise routing system and method used within an enterprise imposes routing instructions superseding gateway protocol routing thus allowing VPN and content caching applications to be run efficiently and securely without resort to an enterprise dedicated backbone.

34 Claims, 1 Drawing Sheet

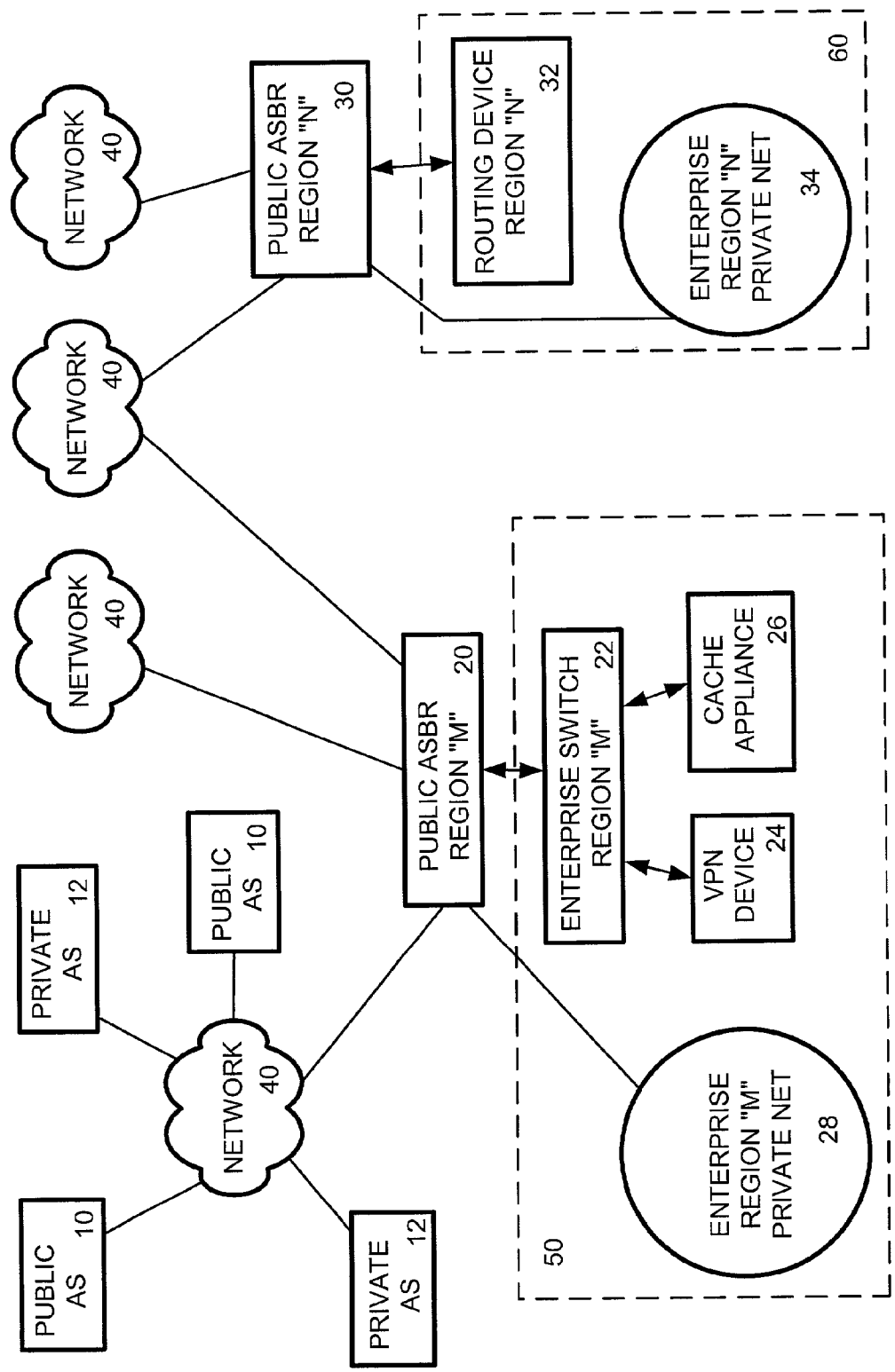

POLICY BASED ROUTING SYSTEM AND METHOD FOR CACHING AND VPN TUNNELING

FIELD OF THE INVENTION

The present invention relates to Internet Protocol routing. More specifically, the present invention relates to Policy Based Routing (PBR) instructions that supersede gateway protocol routing as used by an enterprise in a public network for purposes of caching and private network tunneling.

BACKGROUND OF THE INVENTION

Network routing, including Internet routing, is dynamic in nature. Dynamic routing protocols are categorized as Interior Gateway Protocols (IGP) and Exterior Gateway Protocols (EGP). EGP is sometimes referred to as Border Gateway Protocol (BGP) or external Border Gateway Protocol (EBGP). An IGP is used within a single autonomous system (AS), that is, a single route controlling entity directs the routing. An EGP (or BGP or EBGP) controls routing from AS to AS. Traversing from one AS to the next is a "hop".

Managing an IP network has become increasingly demanding and complex as the networks traverse more heterogeneous platforms, as the segmentation of LANs increase, and as the number of mobile applications expand. Further, as more hosts and routers are added to the Internet and private intranets, routing tasks requiring locating, aggregating, and determining routing paths to reach an IP address has become more difficult. Particularly troublesome is how an aggregation can be reached from any desired location in an efficient, speedy manner.

Additionally, there has been substantial traffic growth from bandwidth consuming applications, such as electronic commerce, email and the Internet. This traffic growth, along with more complex routing management, creates a need for new networking technologies to improve throughput and thereby reduce network congestion. Some solutions include increased transmission speed. Other solutions to network congestion call for greater capacity, more intelligent routing schemes, or some combination thereof.

Intelligent routing can be achieved by using a Layer 4 switch or similar appliance. Layer 4 switches provide broad control over data packet traffic by parsing a data packet to identify the data packet's characteristics and traffic types, such as SMTP. Based on the packet information retrieved, "policy based management" can be applied. Included in policy based management is "policy based redirection" (redirects traffic to alternate carriers, routers, or appliances), "policy based routing" (directs traffic to traverse specific, static paths, typically in one hop and the data is encapsulated) and "policy based handling" (directs special treatment for a data packet). Policy based management applies policies to a data packet handling and flow so the data packet is redirected to a particular network or node, traverses a pre-determined route, receives a level of bandwidth, or gets a priority treatment or other quality of service such as a particular security handling.

Further, Layer 4 switches provide application level control, thus allowing application of security filters as well as the ability to impose policy based management. Policy based management can be applied to a single host-to-host transmission, or encompass all the transmissions in the network.

A typical implementation of Layer 4 switching function is to assign different priorities to different applications. For example, using a Layer 4 switch, an administrator can assign a different priority to e-mail applications than database applications as a "policy". Or, for example, packets that are part of an interactive application may be assigned a higher priority than packets that are part of a bulk file transfer between sites. In this way, critical applications can be guaranteed bandwidth throughout a network, ensuring predictable performance for critical applications.

These switches slow the network transmission down, however, due to the need to determine any special treatment and routing for a given packet. As such, these switches must necessarily examine all packets. The slow down may be partially offset using policy based management to improve network efficiency. However, processing aggregate network traffic over a Layer 4 switch to apply "policy" directions to a small fraction of data packets, while necessary to ensure required packet management for the affected data packets, is inefficient overall.

One way of improving network efficiency for large Internet Service Providers (ISP) and private Enterprise Network Providers (ENP) is to employ a caching system that accelerates the availability of cache content to their users. The concept of caching is commonly used in computer applications. For example, frequently used instructions and data are cached to accelerate processing tasks. Network caching uses the same concept storing content for caching at network servers or cache appliances. Network content is placed in a cache appliance or server closer to end users thus reducing the number of network "hops" required for retrieving content. This concept of spreading documents in demand at one or more locations within a network is referred to as "distributed caching".

A Layer 4 switch enhances the caching system performance by serving as a filter to the cache appliance. Such a switch can inspect the data packet traffic and make policy based decisions. The switch can redirect specific data packets to the cache appliance or to the location that has stored (cached) a copy of the desired document. The rest of the traffic is forwarded to the Internet with no routing changes. However, all data packets are inspected before identifying which data packets are to be redirected to the cache appliance or cache server and which are to be sent back to the network.

For example, large ISP's and ENP's offering Cache specific destination Web Sites must process the aggregate traffic stream. Even if the ISP or ENP uses the Web Cache Communication Protocol (WCCP), a method for cache redirection using a generic routing encapsulation (GRE) tunnel between the router and the Cache Device, the WCCP method still requires that the ISP process the aggregated traffic stream.

Encapsulation, as used in a communications system, is a technique used to add control information to the protocol data unit (PDU) element of a data packet that precludes parsing the data packet as it is transported over a network. In this respect, the layer encapsulates the data from the layer that supports the data. For all intent, the body of the data packet remains enclosed or hidden (in a capsule). Once received by the target device (in this case a cache appliance), the data becomes available to be de-capsulated.

Another potential bottleneck is the use of shared Internet infrastructure to support an ENP or ISP private network. In order to avoid costs of supporting private network infrastructure, an enterprise or ISP constructs a network for private use of its clients using public networks such as the Internet. The public network infrastructure is used to transmit data packets to different regional locations of the private network. This type of network is referred to as a virtual private network (VPN). Besides adding demand to the Internet, a special protocol, such as layer 2 tunneling protocol, is required to forward data packets destined for distribution to multiple VPN regions.

Layer 2 Tunneling Protocol (L2TP) is a protocol used to support virtual private network communications over the Internet. Tunneling protocol supports non-IP protocols used within a private network to be transmitted over public network protocols using standard IP protocols. "Tunneling" is the term for transmitting a data packet of one protocol, structured in one format, in the format of a second protocol. That is, the body of the data packet is encapsulated (as discussed above). Tunneling allows other types of transmission streams to be carried within the prevailing protocol. For example, a foreign protocol carried within a TCP/IP packet is "tunneling." Further, tunneling allows a "cutting through" the Internet without interruption. To "tunnel" is to treat a transport network as though it were a single communication link or LAN. This extra handling and treatment, including special treatment for applying a security protocol, is a source for further congestion.

Tunneling and encapsulating techniques, accelerating retrieval of cache content using cache servers and appliances, and the use of policy based management of network traffic are known.

It has been proposed to provide policy based decision logic to decide whether a data packet should be transmitted over a public network within a Virtual Private Network (VPN) framework. The decision is based on "trust level" of the network(s) traversed and the encryption method employed. For additional details, refer to U.S. Pat. No. 6,178,505 to Schneider et al., entitled "Secure Delivery of Information in a Network." VPN tunneling and the use of secure transmission, such as IP Security protocol (IPSec), are also described in the Schneider patent.

It has been proposed that a border server act as a security filter between a client of an ENP and the Internet. In an application where the client makes a cache request from a non-secure URL within the public network, this system converts the "source" URL of the cache content to a secure URL. The enterprise has a border server that is the "advertised" IP address of the client's "target". All packets from the client are redirected to the border server for parsing and analysis. The border server, finding a request for cached data at a non-secured URL, retrieves the data, caches the data and converts the data source's URL to a secure URL. The border server uses tunneling to transmit the data and the "converted" URL to the client using SSL as the means of securing the traffic. For additional details, refer to U.S. Pat. No. 6,081,900 to Subramaniam et al., entitled "Secure Internet Access."

It has been proposed to provide a system whereby the user of a portable laptop is able to maintain a consistent IP address regardless of the locale of connectivity. Further, the laptop appears to be connected to a home network. This is achieved by having a portable router device tunnel all traffic to and from a fixed router device associated with the home network using an encapsulation method. For additional details, refer to U.S. Pat. No. 6,130,892 to Short et al., entitled "Nomadic Translator or Router." The Short invention uses directed, one hop tunneling to reach a destination target. The target address is a fixed, single address.

A policy based access decision algorithm has been proposed wherein a private network allows limited, varying levels of access to users of different networks. The system "decides" what resources of the private network may be accessed by specific users. Access permission is established with a policy based algorithm. Further, those permitted access to secure zones exchange traffic using tunneling techniques as if the permitted users were part of a VPN. For additional details, refer to U.S. Pat. No. 6,182,226 to Reid et al., entitled "System and Method for Controlling Interaction Between Networks."

A system of cache servers positioned in a network has been proposed to get the most efficient use of caching techniques for reduction of network traffic. The resultant positioning location of the cache servers resembles an inverted tree. (As an aside, the use of an inverted tree structure is one of the most efficient ways of sorting and retrieving ordinal data.) The implementation involves use of a packet filter at each router serving a cache server to direct document request packets to the associated cache server. The filter uses a rule based algorithm to determine if the request packet should be redirected to the cache server. Standard routing protocols are used to transmit data packets to the redirection destination. For additional details, refer to U.S. Pat. No. 6,167,438 to Yates et al., entitled "Method and System for Distributed Caching, Prefetching and Replication."

A method has been proposed for placing data packets on one of several queues based on the data packet classification as determined by an access device. This policy based queue placement determines the treatment of the data packets with respect to de-queuing priority and bandwidth allotment. For further details, refer to publication no. US2001/0030970 of a pending U.S. patent application by Wiryaman et al., entitled "Integrated Access Point Network Device."

The access device of the Wiryaman publication is positioned between a site router and a site LAN. The site router is the gateway to a WAN (i.e., a public network such as the Internet). The access device processes the packet for identifying the class of data, assigning the packet to one of a plurality of queues where a packet on one queue receives different priority treatment and bandwidth availability. The queues are de-queued based on the queue's priority level, not on a first-in-first-out basis. Classifying, queuing, de-queuing scheduling, determining routing destinations as well as encapsulation are done at the access device.

The disclosures cited above, all advancing policy management of network traffic, reveal that tunneling and encapsulating techniques, accelerating retrieval of cache content using cache servers and appliances, and the use of policy based management of enterprise network traffic are known. Some of the citations provide for an "intervening device" to examine, parse and otherwise process individual data packets. Examining and analyzing the network traffic results in some action, such as redirection, affecting the data packet transmission or access permission. Two citations use a router to act in a proxy like manner for purposes of intervening in data packet flows.

Except for the Wiryaman publication, the cited disclosures do not describe a system or method that processes data packets exclusively destined for the enterprise. As a result, substantial extraneous traffic flows through the "intervening device". Further, none of the cites provides for redirection to one or more dedicated appliances to perform highly specific tasks for a specific application. The Wiryaman publication combines several highly specific tasks into a single device including queuing decisions and takes over some routing functions.

In contrast to the technology of the cited disclosures, network utilization efficiency and reduced traffic processing resulting in less congestion, quicker retrieval of cached content would occur if an intervening device only processed traffic specifically associated with its enterprise network. Further, the use of parallel processing capability of specialized, data packet processing appliances and devices would further enhance speed and efficiency. This way, an enterprise network provider or an ISP has the option to provide a responsive, efficient, secure virtual private network without the need for internal backbone resources.

What is needed is a routing system and method that directs a data packet to and from a target cache appliance over a specific route without having to process the aggregated traffic stream. What is also needed is a routing system, using a VPN device, that can target the specific route between a public Autonomous System Border Router (ASBR) serving a given ENP region to another public ASBR servicing a different ENP region, again, without having to process the aggregated traffic stream.

BRIEF SUMMARY OF THE INVENTION

It is therefore an object of the invention to receive traffic at an ASBR router, from one or more interfaces, if traffic is destined for an external ENP resource, wherein the traffic is redirected based on a locally established route entry. The route entry is injected or redistributed into the IGP so that all data packets exclusively destined for the ENP network are processed by the ASBR.

It is another object of the invention for the ASBR to forward a data packet to a directly connected VPN device or to a directly connected cache appliance so that a highly specialized data packet processor appliance can operate in parallel thus providing speedier, more efficient private network management.

It is a further object of the invention to impose policy based routing (PBR) decisions on an ASBR for a data packet containing a "Target" destination IP address, subsequent to being processed by the VPN device or cache appliance.

It is still a further object of the invention to use PBR decisions for caching and VPN tunneling techniques.

It is another object of the invention to use a data packet processing switch as an intermediate connecting device between the ASBR router interface and either the directly connected VPN device, the directly connected cache appliance or both.

It is still another object of the invention to use a Variable Length Subnet Mask (VLSM) addressing technique to purposely supersede E-BGP learned routes of a "Target" EN with a locally established route.

It is yet another object of the invention to transmit data packets securely over a public network.

It is a further object of the invention to avoid the need for an internal, private router within an enterprise using VPN and/or Distributed Caching.

In contrast to the disclosures cited above, the present invention uses the ASBR to route the data packets where the ASBR is given new tables and algorithms to follow regarding any affected data packets.

According to one embodiment, the present invention provides a system and method for controlling and diverting network traffic destined for an Enterprise Network (EN), redirecting the traffic to special appliances for further, parallel processing and directing the traffic back to a network router. Only EN traffic is processed.

Caching redirection and Site-to-Site VPN conventionally involve placement of data packet processor such as a Layer 4 Switch or a VPN device in-line with the traffic flow. The present invention eliminates the need for data packet processing devices to be in-line with the traffic flow and therefore does not impede traffic or degrade system performance for very high bandwidth connections (OC-3, OC-12, 1 Gigabit per sec, OC-48, etc.). This solution relies on normal routing processes to only redirect specific traffic to the caching appliance or VPN device yielding higher internal throughput performance.

According to one embodiment, the present invention only redirects selected traffic flows with minimum bandwidth requirements and therefore uses an inexpensive interface to connect directly attached devices (i.e., VPN device or cache appliance).

The VPN device or cache appliance processes traffic as appropriate for VPN tunneling or caching, inserting, as appropriate, new destination addresses (for example, a redirected destinations for cache retrieval), new source addresses (for example, insertion of the cache appliance's source address in place of the requesters source address, for a cache content retrieval from the origin server) and any other special treatment into the packet.

The device then sends the traffic back to the same router interface over the same interface that delivered the data packet. If the destination IP address belongs to a remote enterprise "Target" address, the packet will be routed to the router interface associated with the next-hop "external border gateway protocol" (E-BGP) destination AS for the target. This policy-based forwarding decision takes precedence over an installed entry in the routing table or a standard protocol routing algorithm available to the ASBR.

A data packet returned from the device that does not have a remote enterprise target route destination address, will be routed normally using the installed routing table.

A returned data packet that has a destination address within the local enterprise site (for example, an address on an attached site LAN) will be routed to the local destination address without going through the public network.

The present invention relies on a security protocol, IP Security Protocol or "IPSec", that allows the data packet format and the IP transport format to be different. The routing decision to forward the packet to a remote VPN device(the next-hop E-BGP router address) is based on the destination address. It is done on the inbound direction of the ASBR interface connected to the VPN device and is used over the standard IP routing protocol of the AS router. Again, this is a policy-based forwarding decision, or generically referred to as Policy Based Routing (PBR). Most router vendors are capable of PBR and offer this as a standard configurable feature.

The interface device, as noted, is part of the enterprise system. It is an interface between the enterprise regional site and a public, AS router (particularly an ASBR). Examples of the interface device are a Cisco GSR12XXX and a Juniper M20 carrier-class routers. One example of a data processing switch is the Cisco Content Services Switch model CSS11000. An example of the Cache Appliance is the CacheFlow 1000. A VPN device example is the Nokia CC 2500. It is a further object of the invention to optionally provide reliability through redundancy of equipment.

The present invention accomplishes the prior stated objects by: 1) local traffic forwarding using specific routes and injecting those routes into the IGP 2) imposing PBR directives to supersede specific routes; and 3) using specialized appliances for parallel, dedicated processing of caching applications and VPN tunneling applications.

SUMMARY OF THE DRAWING FIGURE

The FIG. 1 illustrates a network routing topology according an exemplary embodiment of the present invention.

DETAILED DESCRIPTION OF THE VARIOUS EMBODIMENTS

The present invention is a system and method for controlling and diverting network traffic destined for an Enterprise Network (EN). An ASBR router uses locally originated routes for a remote EN, redirects traffic to specialized appliances for further, parallel processing of data packets. The locally sourced EN routes can be originated by the ASBR or by the specialized appliances. The processed data packets are returned to the ASBR router interface, which in turn imposes Policy Based forwarding rules. These forwarding rules take precedence over the locally sourced routes. Caching and VPN routing applications are implemented.

For purposes of this application, an "enterprise" includes all users and/or subscribers of a private network, whether the network is virtual in nature or otherwise. A user may be an e-commerce business partner or even an ISP subscriber. Further, an "enterprise network" is a network accessible by a limited, known set of approved users and may, under some conditions be referred to as an Intranet.

Referring to the FIGURE, a networking routing topology of the present invention is illustrated. Various carrier networks 40 are linked to various Autonomous System (AS) routers 10, 12, which are routers that may be public routers 10 or private routers 12, reflecting current network topology. The public ASBR 20 is local to a region, which, for purposes of illustration is labeled as region "M." Region "M" contains one or more users of the enterprise network. The EN "M" locale 50 is delineated by a dotted line in the FIGURE.

One aspect of the invention is to route "Target" traffic using normal destination based routing. This is accomplished by imposing a local static route on the public ASBR 20 for a network belonging to Region "N." The local route for region "N" is redistributed into the IGP for region "M." The local IGP route causes traffic destined for region "N" to pass through the ASBR before exiting region "M."

The public ASBR 20 located in Region "M" forwards all data packets with a "Target" address of Region "N" to the data processing switch 22 in region "M."

The switch 22 in one embodiment of the present invention is a Layer 4 switch that can apply special routing instructions, priorities, filters, and the like to a data packet. The Cisco Content Services Switch model CSS11000 is an example of a commercially available switch that parses a data packet to glean routing and content information. The switch 22, in turn, redirects the data packet to a specific cache appliance 26 for a distributed caching application when the data packet is detected as a being a request for content or the content itself. The cache appliance has logic to find the requested content at a known nearby location, thus accelerating the cache content retrieval. The cache appliance also has logic to cache the content, once retrieved at some strategic location for future ENP users. An example of a cache appliance is the CacheFlow 1000.

The specific cache appliance 26 is used to implement rapid retrieval of content thus shortening the waiting time for delivery of content to ENP users. Not only does this increase user satisfaction, the traffic demand on public and private networks is substantially reduced.

The application is sometimes referred to as "content caching." As users retrieve content of data from the EN, the cache of that content is maintained on a designated cache server and the cache appliance 26 catalogues the content's location. In this way a subsequent user's request for the same content is redirected by the switch 22 to the cache appliance 26 and the content is retrieved more rapidly from the cache server. The content need not be transmitted from the original source under this scheme thus lowering retrieval time and network congestion while increasing network efficiency.

The cache appliance uses an algorithm to make the most recent and/or most used contents readily accessible from the cache appliance. Typically a cache appliance can service multiple EN sites.

Because of public network congestion, EN's typically use a dedicated backbone system including a private router to control access to and accelerate delivery of cache contents. The present invention allows this content caching application to be run efficiently and securely without the need for a private, enterprise backbone. Similarly, the present invention allows messaging and other data to be transmitted across public networks to EPN clients without the need of a dedicated enterprise backbone. The present invention can implement a cache application and a VPN application in parallel, separately, or in sequence.

Referring again to the FIGURE, in one embodiment of the present invention, the data processing switch 22 redirects a VPN data packet to a VPN device 24. Switch 22 as well as the VPN device 24 is within the EN local site 50 for region "M." The VPN 24 device maintains and optionally advertises router table entries for all recipients within a VPN. Routing rules take into account network metrics such as workload balance, AS availability, secured path availability and network congestion. A commercially available VPN device is the Nokia CC2500 Gateway.

In one embodiment of the present invention, the ASBR 20 for region "M" communicates directly with the VPN device 24, bypassing the data processing switch 22 whenever the data packet is associated with terminal VPN communications as opposed to a caching application.

Cache or other data destined for a terminal within the region "M" receive the cache or data over the internal, private network 28. If the cache or data is destined to an EN site location in a region other than "M", for example region "N", then the data packet is transmitted back to the public, region "M" ASBR 20 via a "tunnel" to the target region's AS border router.

Policy based routing rules are executed on the ASBR. The data packets received from the data processing switch 22 or from the VPN device 24 are inspected at the respective ASBR interface. PBR rules are applied accordingly based on the destination addresses and therefore supersede the border gateway protocol (BGP) routing tables governing routing decisions for the ASBR 20.

The FIGURE shows, for illustration purposes, a data packet originating from region "M" and a destination in region "N". Effectively, PBR causes a "tunnel" to be created between VPN regional resources. PBR instructions may also dictate which carrier network to use, thus allowing the preference order in the choices for "tunneling." This allows the use of secured resources with the Internet. One security IP protocol is referred to as "IPSec."

The data packet is received at ASBR 30 through normal BGP routing, where it is routed to the enterprise's private routing device 32 within the region "N." Local EN site 60 for region "N" as outlined by a dotted line. Typically, region "N" routing equipment, appliances and devices will mimic what is available in other enterprise regional network installations. Therefore, routing device for region "N" 32 may be an enterprise switch that is in communication with a regional network 34 and is also directly connected to a VPN device and a cache appliance (not shown).

This network topology of the present invention as illustrated in the FIGURE will require minimal changes to an enterprise's existing regional network. This solution will use both standard Interior Gateway Protocol (IGP) routing, such as open shortest path first (OSPF), and a routing feature called Policy Based Routing (PBR) as discussed supra. PBR directs forwarding based on a source IP, a destination IP, TCP port number, etc., or any combination of these and not based exclusively on a routing table. PBR uses a route-map with embedded access-lists and forwarding statements. Any traffic received on the inbound interface from a Layer 4 switch or VPN device destined for the enterprise's URL or network IP will be forwarded to an upstream transit provider. All other traffic will be routed normally using destination based forwarding.

PBR will not impact performance of the router because it will only be used on the interface that connects to the enterprise's router interface, typically a Layer 4 switch. This interface will have relatively low levels of traffic. The PBR will only process traffic in the inbound direction. Router modifications also require a specific host or network route for the enterprise's URL or network IP address to point at the router interface. This route will be redistributed into OSPF for access from within the Region.

A VPN solution must be implemented for each Region to provide a site-to-site encrypted "tunnel" between regions and back to central operations control location (COCL). The framework for a Distributed Caching solution is compatible with the present invention's VPN tunneling solution. All traffic destined to the COCL is protected. Further, existing ISP links can be utilized as the transport.

Redundancy is an optional aspect of the present invention. An alternate embodiment of the present invention provides for redundant public network AS border routers, linked to duplicate router interfaces, which in turn redirect VPN and cache application data packets to redundant appliances and devices. This arrangement provides for improved reliability in the event any of the critical elements of the system are non-functioning. Further, a redundant scheme provides for improved throughput and reduced local EN congestion.

One embodiment of the present invention uses Classless Inter-Domain Routing (CIDR) IP address. CIDR is a replacement of the process that assigns one class out of the set of classes, Class A, B and C. Class addressing scheme uses a generalized network "prefix" or network identifiers of 8, 16 or 24 bits. CIDR IP address uses prefixes anywhere from 13 to 27 bits. Thus, a block of addresses can be assigned to networks of up to 32 hosts (5 bits remaining from a "27" prefix) or to networks of more than 500,000 hosts (19 bits remaining from a "13" prefix). This allows for address assignments that much more closely fit an organization's specific needs.

A CIDR address includes the standard 32-bit IP address and also the number of bits used for the network prefix. CIDR syntax is AA.BB.CC.DD/NN where AA.BB.CC.DD is the 32 bit IP address. The /NN string represents the number of bits used to identify a unique network. The remaining bits (32-NN) identify the host ID within the unique network. For example, in the CIDR address 222.113.11.129/25, the "/25" indicates the first 25 bits are used to identify the unique network and the remaining 7 bits identify the specific host ID. In this example the host ID is 1000001, or 65 in decimal notation, and the unique network address is 222.113.11.1. CIDR "/25" leaves 7 bits to identify the host ID which may number from 0–127, or a maximum of 128 hosts for this unique CIDR network.

The targeted host route will now include a subset of the CIDR block of addresses for an enterprise's VPN. PBR will include all traffic to COCL. The IGP Layer 4 switch's ACL will have additional identifiers added to differentiate between content that is to be tunneled and not tunneled. Traffic to be tunneled will be sent over an IP Secured (IPSec) tunnel as discussed supra. In all other aspects, the VPN solution mimics the Cache appliance routing solution.

A policy based routing system and method for caching and VPN tunneling has now been illustrated. It will be apparent to those skilled in the art that other variations in, for example and without limitation, the type of PBR logic or method, such as a hard scripted routing table, can be accomplished without departing from the scope of the invention as disclosed.

I claim:

1. A system for redirecting network traffic to a target route comprising:
   a public network regional router for routing data packets according to a gateway routing protocol;
   a router interface device dedicated to an enterprise, the router interface device comprising:
      an interface for sending and receiving a data packet to and from the public network regional router wherein the public network regional router routes-data packets destined for the enterprise network to the router interface device; and
      logic for redirecting the data packet via the target route to a special purpose data packet device, wherein the special purpose data packet device comprises:
         communication logic for sending and receiving a data packet to and from the router interface device;
         logic for analyzing and modifying the data packet;
         logic for inserting policy based management instruction within the public network regional router; and
         logic for processing the data packet for one hop delivery wherein the policy based management instruction supersedes the gateway routing protocol.

2. The system of claim 1 wherein the special purpose data packet device is a cache appliance wherein the cache appliance comprises logic for storing a location of active cache data for the enterprise network allowing accelerated cache retrieval for enterprise network users.

3. The system of claim 2, wherein the cache appliance further comprises logic for accessing the active cache data based on a latest time of storage.

4. The system of claim 2, wherein the cache appliance further comprises logic for accessing the active cache data based on a frequency of use.

5. The system of claim 1 wherein the special purpose data packet device is a VPN device comprising logic for identifying a target enterprise network destination address for the data packet.

6. The system of claim 1 further comprising a second special purpose data packet device wherein the second special purpose data packet device is a VPN device.

7. The system of claim 1 wherein the router interface device is a Layer 4 switch.

8. The system of claim 1 wherein the router interface device further comprises logic for encapsulating the data packet for secure tunneling transmission across the public network.

9. The system of claim 1 wherein the special purpose data packet device further comprises logic for encapsulating the data packet for secure tunneling transmission across the public network.

10. The system of claim 1, wherein the system is redundant so as to further comprise at least one duplicate public network regional router, at least one duplicate router interface device, and at least one duplicate special purpose data packet device.

11. The system of claim 1 wherein the data packet uses a CIDR IP addressing.

12. An enterprise network routing method comprising:
routing data packets according to a gateway routing protocol across a public network;
forwarding a data packet at a router interface device dedicated to an enterprise, the forwarding comprising:
sending and receiving the data packet to and from the public network via a public network regional router wherein the public network regional router routes data packets destined for the enterprise network to the router interface device;
redirecting the data packet to a special purpose data packet device wherein the special purpose data packet device is adapted for:
sending and receiving the data packet to and from the router interface device;
analyzing and modifying the data packet;
inserting policy based management instruction within the public network regional router; and
processing the data packet for one hop delivery wherein the policy based management instruction supersedes the gateway routing protocol.

13. The enterprise network routing method of claim 12 wherein the special purpose data packet device operates as a cache appliance, wherein the cache appliance stores a location or active cache data for the enterprise network thereby allowing accelerated cache retrieval or enterprise network users.

14. The enterprise network routing method of claim 13, wherein the cache appliance accesses the active cache data based on a latest time of storage.

15. The enterprise network routing method of claim 13, wherein the cache appliance accesses the active cache data based on a frequency of use.

16. The enterprise network routing method of claim 12 wherein the special purpose data packet device operates as a VPN device and identifies a target enterprise network destination on address for the data packet.

17. The enterprise network routing method of claim 12 wherein the redirecting the data packet to a special purpose device further comprises redirecting the data packet to a cache appliance or a VPN device.

18. The enterprise network routing method of claim 12 wherein the router interface device, at which the forwarding a specific data packet occurs, is a Layer 4 switch.

19. The enterprise network routing method of claim 12 wherein the router interface device encapsulates the data packet for secure tunneling transmission across the public network.

20. The enterprise network routing method of claim 12 wherein the special purpose data packet device encapsulates the data packet for secure tunneling transmission across the public network.

21. The enterprise network routing method of claim 12 wherein the method is practiced via an enterprise network having redundancy provided by a duplicate public network regional router, a duplicate router interface device, and a duplicate special purpose data packet device.

22. The enterprise network routing method of claim 12 further comprising identifying specific data packets using a CIDR IP notation.

23. An enterprise network routing system comprising:
a public network regional router for routing data packets according to a gateway routing protocol;
a router interface device dedicated to an enterprise, the router interface device comprising:
an interface for sending and receiving a data packet to and from the public network regional router wherein the public network regional router routes data packets destined for the enterprise network to the router interface device;
logic for redirecting the data packet to a special purpose data packet device, wherein the special purpose data packet device comprises:
communication logic for sending and receiving the data packet to and from the router interface device;
logic for analyzing and modifying the data packet;
logic for inserting policy based management instruction within the public network regional router; and
logic for processing the data packet for one hop delivery wherein the policy based management instruction supersedes the gateway routing protocol.

24. The system of claim 23, wherein the special purpose data packet device is a cache appliance wherein the cache appliance comprises logic for storing a location of active cache data for the enterprise network allowing accelerated cache retrieval for enterprise network users.

25. The system of claim 24, wherein the cache appliance further comprises logic for accessing the active cache data based on a latest time of storage.

26. The system of claim 24, wherein the cache appliance further comprises logic for accessing the active cache data based on a frequency of use.

27. The system of claim 23 wherein the special purpose data packet device is a VPN device comprising logic for identifying a target enterprise network destination address for the data packet.

28. The system of claim 23 further comprising a second special purpose data packet device wherein the second special purpose data packet device is a VPN device.

29. The system of claim 23 wherein the router interface device is a Layer 4 switch.

30. The system of claim 23, wherein the router interface device further comprises logic for encapsulating the data packet for secure tunneling transmission across the public network.

31. The system of claim 23 wherein the special purpose data packet device further comprises logic for encapsulating the data packet for secure tunneling transmission across the public network.

32. The system of claim 23 wherein the system is redundant so as to further comprise at least one duplicate public network regional router, at least one duplicate router interface device, and at least one duplicate special purpose data packet device.

33. The system of claim 23 wherein the data packet uses a CIDR IP addressing.

34. An enterprise network routing system comprising:
means for routing data packets in a region of a public network according to a gateway routing protocol;
means for interfacing the means for routing, the means for interfacing being dedicated to an enterprise network, the means for interfacing comprising:

means for sending and receiving a data packet to and from the means for routing, wherein the means for routing routes data packets destined for the enterprise network to e means for interfacing;

means for redirecting the data packet to a special purpose data packet device according logic, wherein the special purpose data packet device comprises:

means for sending and receiving the data packet to and from the router interface device;

means for analyzing and modifying the data packet;

means for inserting policy based management instruction within the means for routing; and means for processing the data packet for one hop delivery wherein the policy based management instruction supersedes the gateway routing protocol.

\* \* \* \* \*